United States Patent
Rydberg

(10) Patent No.: US 6,872,033 B2
(45) Date of Patent: Mar. 29, 2005

(54) TURNING TOOL FOR FORM-TURNING WORKPIECES

(75) Inventor: Christer Rydberg, Fagersta (SE)

(73) Assignee: Seco Tools AB, Sandviken (SE)

( * ) Notice: Subject to any disclaimer, the term of this patent is extended or adjusted under 35 U.S.C. 154(b) by 75 days.

(21) Appl. No.: 10/147,882

(22) Filed: May 20, 2002

(65) Prior Publication Data

US 2002/0192042 A1 Dec. 19, 2002

(30) Foreign Application Priority Data

May 18, 2001 (SE) .............................................. 0101752

(51) Int. Cl.⁷ .............................................. B23B 27/16
(52) U.S. Cl. ...................................... 407/103; 407/77
(58) Field of Search .............................. 407/77, 79, 80, 407/96, 97, 102, 103, 104, 117

(56) References Cited

U.S. PATENT DOCUMENTS

| | | | |
|---|---|---|---|
| 1,354,578 A | 10/1920 | Ritchie | |
| 1,938,717 A | * 12/1933 | Oxford | 407/79 |
| 2,453,464 A | * 11/1948 | Sheridan | 407/95 |
| 4,437,802 A | * 3/1984 | Hall, Jr. | 408/197 |
| 4,632,609 A | * 12/1986 | Johne | 408/197 |
| 5,725,334 A | * 3/1998 | Paya | 407/117 |
| 5,924,826 A | * 7/1999 | Bystrom et al. | 407/103 |
| 6,102,630 A | * 8/2000 | Flolo | 407/42 |
| 6,146,060 A | 11/2000 | Rydberg et al. | |
| 6,220,794 B1 | * 4/2001 | Calamia et al. | 407/40 |
| 6,241,433 B1 | * 6/2001 | Rydberg et al. | 408/233 |
| 6,328,504 B1 | * 12/2001 | Kinukawa | 407/114 |
| 2002/0131829 A1 | * 9/2002 | Persson et al. | 407/77 |
| 2003/0077129 A1 | * 4/2003 | Cirino | 407/53 |
| 2003/0210961 A1 | * 11/2003 | Arvidsson | 407/48 |

FOREIGN PATENT DOCUMENTS

EP   1 038 615   9/2000

* cited by examiner

*Primary Examiner*—A. L. Wellington
*Assistant Examiner*—Dana Ross
(74) *Attorney, Agent, or Firm*—Burns, Doane, Swecker & Mathis, L.L.P.

(57) ABSTRACT

A turning tool includes a holder and an cutting insert clamped to the holder. The insert and the holder include respective support surfaces pressed against one another. Each of those support surfaces includes first and second sets of ridges oriented substantially perpendicular to one another. The ridges on the insert's support surface engage respective ridges on the holders support surface to prevent movement of the insert relative to the holder in two directions oriented perpendicularly to one another. At least one of the first and second support surfaces has its first and second sets of ridges arranged in respective first and second regions of that support surface. The other support surface could have its sets of ridges arranged in a similar fashion, or its sets of ridges could occupy the same region of the support surface to form a waffle pattern.

15 Claims, 5 Drawing Sheets

US 6,872,033 B2

TURNING TOOL FOR FORM-TURNING WORKPIECES

This application claims priority under 35 U.S.C. §§ 119 and/or 365 to Patent Application Serial No. 0101752-4 filed in Sweden on May 18, 2001, the entire content of which is hereby incorporated by reference.

BACKGROUND OF THE INVENTION

The present invention relates to a tool and a cutting insert for form turning, and especially to a configuration of support surfaces for securing the insert to a holder.

PRIOR ART

Through U.S. Pat. No. 6,146,060 is previously known a tool that comprises a cutting insert and a holder. The cutting insert and holder comprise two cooperating support surfaces and a screw to force the surfaces together. The support surfaces are profiled with grooves to allow locking by shape to each other. The cooperating support surfaces allow at least four separate positions in relation to each other by means of a special waffle pattern.

In U.S. Pat. No. 1,354,578 is shown a tool wherein a grooved cutting insert is held in the holder with the assistance of a wedging effect. There are practical difficulties in wedging a cutting insert in a simple and exact manner.

OBJECTS AND SUMMARY OF THE INVENTION

One object of the present invention is to provide a cutting insert and a tool for form turning which achieves prior art advantages.

Another object of the present invention is to provide a cutting insert and a tool for form turning where the cutting insert can be mounted on the holder in a simple manner.

Still another object of the present invention is to provide a cutting insert and a tool for form turning where the cuffing cutting insert is rigidly held on the holder.

Still another object of the present invention is to provide a tool for form turning having a minimum of parts.

These and other objects have been achieved by a turning tool for form-turning work pieces. The turning tool comprises a holder, a cutting insert mounted on the holder, and a clamp element for clamping the insert to the holder. The cutting insert is elongated along an axis and includes a nonlinear cutting edge at an axial end thereof. The cutting insert includes a first support surface and a first hole. The holder includes a second support surface and a second hole. The second hole is aligned with the first hole for receiving the clamp which presses the first and second support surfaces together. Each of the first and second support surfaces includes first and second sets of ridges oriented substantially perpendicularly to one another. At least one of the first and second support surfaces has its first and second sets of ridges arranged in respective first and second regions of that support surface. The first set of ridges of the cutting insert engages the first set of ridges of the holder to support the cutting insert against movement in a first direction. The second set of ridges of the cutting insert engages the second set of ridges of the holder to support the cutting insert against movement in a second direction substantially perpendicular to the first direction. One of the first and second holes is elongated in a direction to enable the insert to be fed in that direction relative to the holder.

The invention also relates to a turning insert which comprises an upper surface and a support surface disposed opposite the upper surface. The cutting insert is elongated along an axis and includes a non-linear cutting edge at one axial end of the turning insert. The cutting edge is disposed substantially in the upper surface. The support surface includes first and second sets of ridges oriented substantially perpendicularly to one another. The turning insert includes a hole which is elongated in a direction intersecting the cutting edge for receiving a clamp and permitting adjustment of the turning insert in the direction of elongation of the hole.

DESCRIPTION OF THE DRAWINGS

The objects and advantages of the invention will become apparent from the following detailed description of preferred embodiments thereof in connection with the accompanying drawing in which like numerals designate like elements, and in which.

Each of FIGS. 5a–5g shows a respective alternate form of the cutting edge portion of the cutting insert.

DETAILED DESCRIPTION OF PREFERRED EMBODIMENTS OF THE INVENTION

Figure 1:
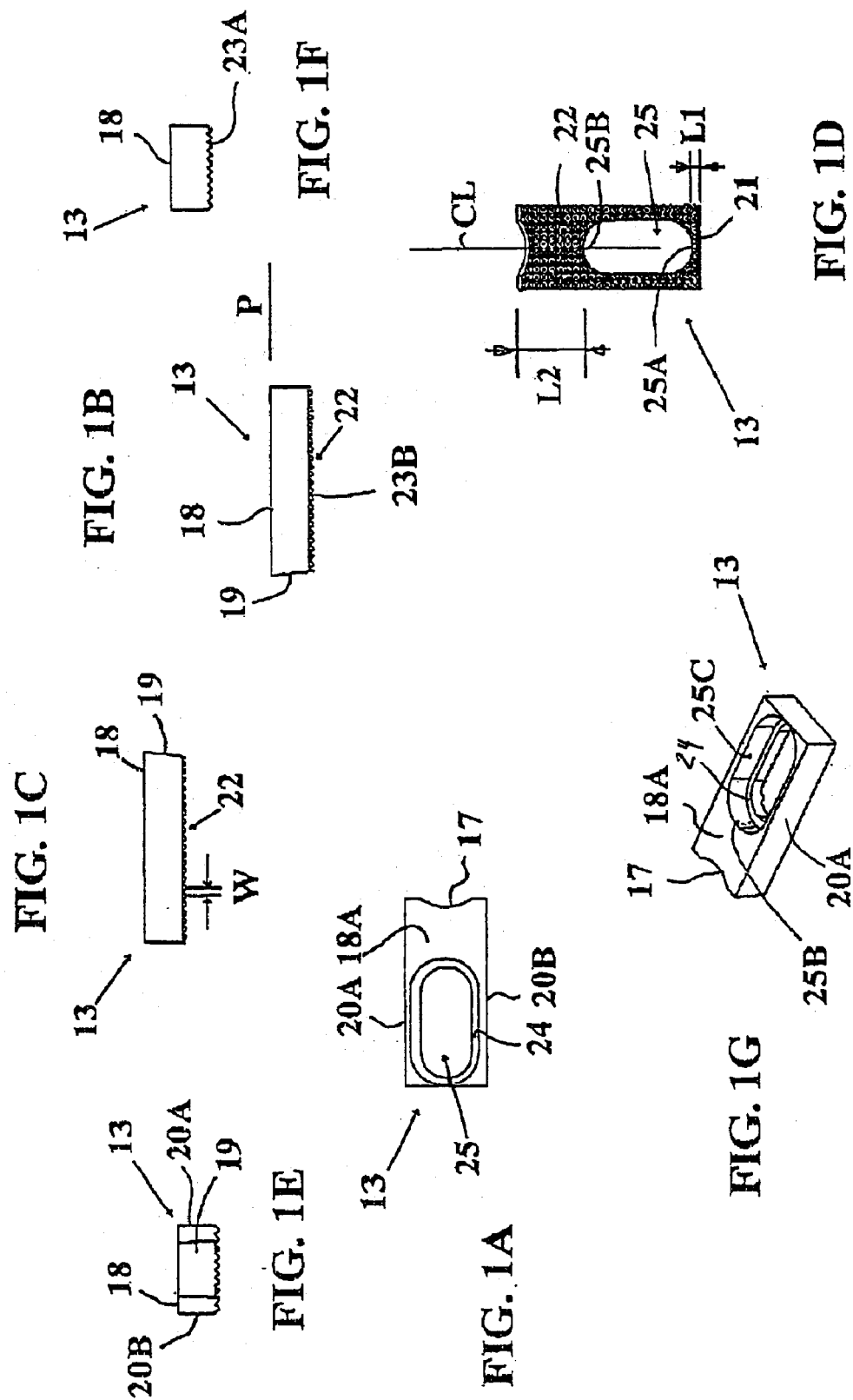
FIG. 1A shows a cutting insert according to the present invention in a top view.
FIG. 1B shows the cutting insert in a side view.
FIG. 1C shows the cutting insert in a side view opposed to FIG. 1B.
FIG. 1D shows the cutting insert in a bottom view.
FIG. 1E shows the cutting insert in a front view.
FIG. 1F shows the cutting insert in a rear view.
FIG. 1G shows the cutting insert in a perspective view.
Figure 2:
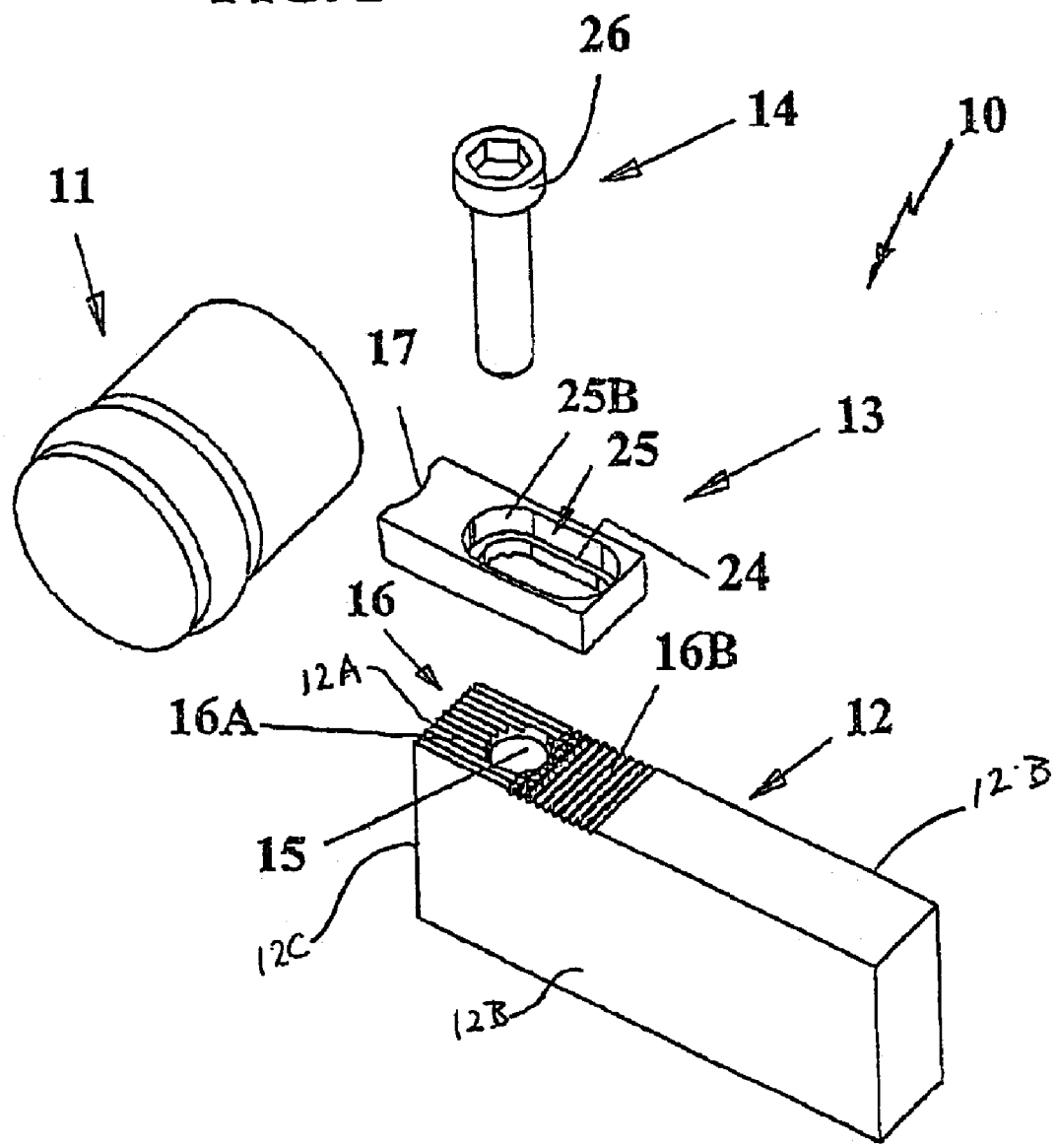
FIG. 2 shows a tool according to the present invention in an exploded view and a work piece.

FIG. 2 shows a tool 10 according to the present invention for form turning comprising a substantially rectangular holder 12, a cutting insert 13 having a cutting edge and a screw 14.

The holder 12 may be made of steel, hard metal or speed steel. One free end of the holder 12 is intended to be secured to a lathe while the opposed other free end comprises a top side, a front portion of which constitutes a support surface 16. Extending through the support surface is a threaded hole 15 which has a conical entering bevel. The support surface 16 has a rectangular basic shape and first and second sets of ridges 16A, 16B. The ridges are defined between grooves that are recessed into the support surface. The first set of ridges 16A is oriented perpendicular to the second set of ridges 16B. The first and second sets of ridges 16A, 16B are arranged in respective first and second regions of the support surface (i.e., only a minimal amount of intersection occurs between the two sets of ridges as will be described). The second ridge set 16B is bordered by the first ridge set 16A and is situated farther from a front edge 12A of the holder than is the first ridge set 16A. The second ridge set 16B intersects the planes of two opposite surfaces 12B of the holder, whereas the first ridge set 16A intersects only a plane of a front surface 12C of the holder. Each ridge set 16A, 16B occupies about one-half of the support surface 16. Each of the grooves which form the ridges is elongated and is substantially V-shaped in cross-section. Each groove has a biggest width W in the magnitude of 0.2 to 2 mm, preferably about 1.5 mm. Each groove has two flanks which, via a sharp or rounded transition, connect to a groove bottom. The flanks form an acute angle with each other. The angle lies within the interval of 40° to 80°, preferably 55° to 60°. Each surface of the insert which borders a set of ridges is preferably planarly shaped and connects to an associated groove flank via an obtuse inner, soft or sharp, transition. The number of ridges in each ridge set depends on how the support surface of the cutting insert is formed, and the number is chosen in the interval 5 to 20 ridges (or grooves). The groove bottom may alternatively be described by a radius of about 0.2 to 0.4 mm. The provision of ridge sets 16A, 16B causes the support surface to have a considerably bigger effective surface area than if the support surface were planar. The ridge sets 16A, 16B together cover at least 80%, preferably 90–100%, of the amenable area of the support surface 16.

The second ridge set 16B is formed by machining, e.g., hobbing or grinding. Subsequently the first ridge set 16A is machined with the same tool in a direction perpendicularly to the first mentioned machining. To obtain full depth in each groove of the first ridge set 16A, it is appropriate that the machining tool is fed somewhat into intersecting relationship with a few of the ridges of the second ridge set 16B. Then said tool will also machine material from those few ridges of the second ridge set 16B to form pyramids or partly pyramid shaped tips.

In FIGS. 1A–1G an elongated cutting insert 13 according to the present invention is shown. The cutting insert may be formed of hard metal, cement or speed steel and shall be used for the turning of profiles in a work piece 11. The cutting insert has a rectangular basic shape and comprises at least one cutting edge 17, which is provided in the forward end of the cutting insert. The cutting edge 17 is shaped at an intersection between an upper side or chip surface 18 and a clearance surface 19. The cutting edge 17 lies essentially in the plane P of the upper side 18 and is non-linear, i.e., it is intended to shape a contour in the work piece. Often a non-linear cutting edge at form turning generates cutting forces whose resultant differs from the plane of the longitudinal axis CL of the cutting insert and therefore a rigid fixture of the cutting insert is of importance for the machining result.

The clearance surface 19 connects to a lower side or support surface 22 of the cutting insert. The support surface 22 has a rectangular basic shape and comprises first and second ridge sets 23A, 23B. Each ridge set substantially covers the entire support surface 22 and comprises a number of identical ridges spaced apart by grooves that are formed in the support surface 22. The ridge sets 23A, 23B extend in respective directions which are perpendicular to each other. Substantially each ridge in the first ridge set 23A intersects the plane of the clearance surface 19, while substantially each ridge in the second ridge set 23B intersects the planes of both side faces 20A, 20B of the cutting insert.

Since both ridge sets 23A, 23B occupy the same region of the support surface, they form a waffle pattern.

Each of the grooves which define each ridge set 23A, 23B is elongated and substantially V-shaped in cross-section. Each groove has a biggest width W and a depth. Each groove has two flanks which, via a sharp or rounded transition, connect to a groove bottom. The flanks form an obtuse angle with each other. The angle lies within the interval of 40° to 80°, preferably 55° to 60°. Each of the surfaces of the insert which border the ridge sets is preferably planarly shaped and connects to an associated flank via an obtuse inner, soft or sharp, transition. The number of ridges in each ridge set 23A, 23B depends on how the support surface of the holder is formed and the number is chosen in the interval of 5 to 20 ridges (or grooves). The bottom of each groove may alternatively be described by a radius of about 0.2 to 0.4 mm.

The presence of the ridge sets 23A, 23B results in the support surface 22 having a considerably bigger effective surface area than if the support surface 22 were planar. The ridge sets 23A, 23B cover at least 80%, preferably 90–100%, of the amenable area of the support surface 22. The ridge sets 23A, 23B are offset in two directions by a distance W/2 relative to the ridge sets 16A and 16B of the holder 12, so that the ridges of each support surface enter respective grooves of the other support surface. The cutting insert has an un-threaded hole 25 for receiving a screw or other clamping means. The hole 25 is elongated in a direction intersecting the cutting edge and is bisected by the longitudinal axis CL of the cutting insert 13. The longitudinal axis CL is parallel with the feed direction F of the tool. The rear rounded end 25A of the hole 25 is placed at a distance L1 from an end surface 21 of the cutting insert. The distance L1 is substantially similar to the width W. The forward rounded end 25B of the hole 25 is placed at a distance L2 from of the cutting insert edge 17, see FIG. 1D. The distance L2 is substantially bigger than the distance L1, preferably at least 5 times bigger to enable many regrindings of the clearance surface 19. Consequently, the cutting insert 13 has been provided with an area 18A between the hole 25 and the cutting edge 17 which is intended to be ground after wear of the previous cutting edge. The hole 25 has a circumferential collar or shoulder 24, which is countersunk relative to the upper side 18 and against which a head 26 of the screw 14 will abut at tightened connection. The shoulder 24 connects upwardly to a circumferential wall 25C. The cutting edge 17 is longer than the biggest width of any of said ends 25A, 25B.

Regarding cooperation of the support surface 16 and the support surface 22 reference is made to U.S. Pat. No. 6,146,060.

Figure 3:
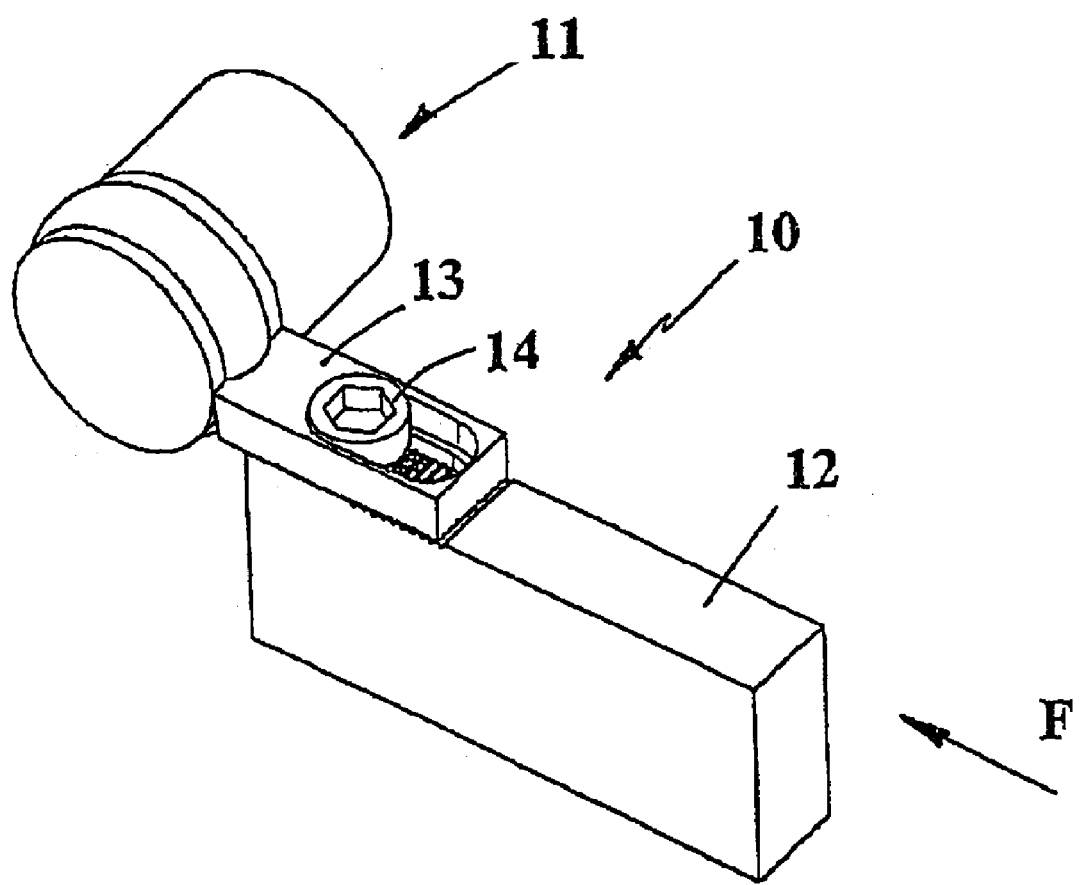
FIG. 3 shows the tool and the work piece in a perspective view.

The milling tool 10 (see FIGS. 2 and 3) is mounted by manually placing the support surface 22 of the cutting insert 13 against the support surface 16 of the holder 12 in one of the four possible positions such that the cutting edge 17 projects outside of the holder's free end. Thereby the ridge/groove directions of the support surface 22 are parallel to the respective ridge/groove directions of the support surface 16. The screw 14 is brought through the insert hole 25 and towards the threaded hole 15. By rotation of the screw 14 by means of a key which is in engagement with the key grip, the cutting insert will be drawn firmly against the support surface, i.e., the position according to FIG. 3 has been achieved, wherein ridges on the support surface 22 enter grooves on the support surface 16, and vice versa. The head 26 of the screw then abuts against the shoulder 24 of the hole 25. The cutting insert 13 is now secured to the holder 12 in a satisfactory manner.

Figure 4:
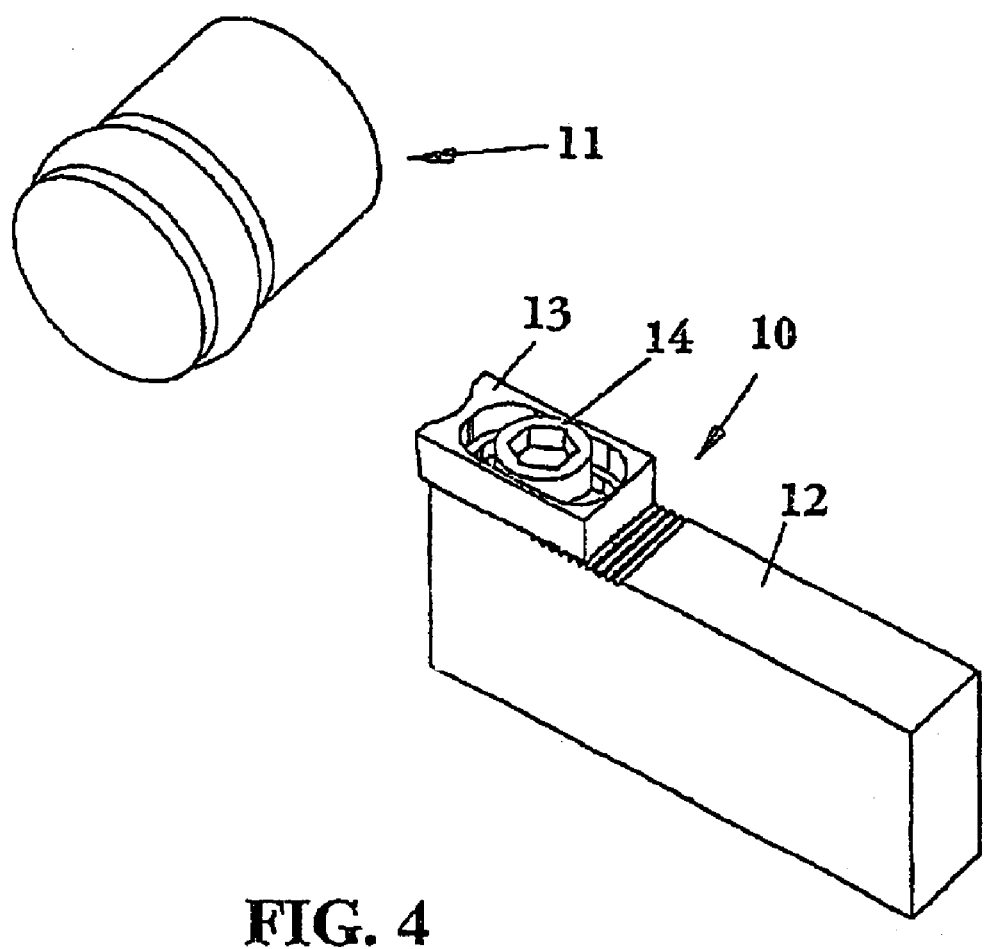
FIG. 4 shows the work piece and the tool with a cutting insert after regrinding in a perspective view.
Figure 5A:
Figure 5B:
Figure 5F:
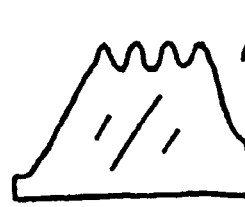
Figure 5C:
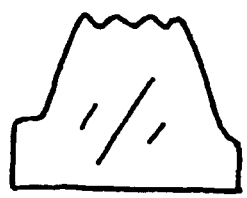
Figure 5D:
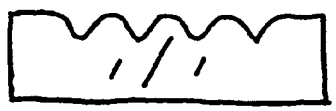
Figure 5G:
Figure 5E:

The reason that only one support surface 22 has a waffle pattern over its entire area is that the tool obtains a more distinct locking effect than if both of the support surfaces 16, 22 were waffle patterned. When the cutting insert 13 shall be replaced, the mounting process is reversed, whereafter the cutting insert can be removed from the holder and be exchanged. FIG. 4 shows the position of the cutting insert 13 on the holder 12 after a number of regrindings of the clearance surface 19, and after the cutting insert has been sequentially fed relative to the holder 12 a number of times corresponding to the number of regrindings. In this position only the straight parts of the shoulder 24 are used. As the cutting insert becomes shorter, all of the ridges of the first ridge set 16A are used, while fewer of the ridges of the second ridge set 16B are used. It should be noted that each groove width W may correspond to one or two regrindings, such that the grinding operator simply can adapt the regrinding with assistance from the cutting insert geometry. Furthermore, the clamping means contributes to the regrinding in such a manner that it guides the cutting insert in the feed direction F such that the cutting insert is not positioned incorrectly in the transversal direction.

In FIGS. 5a–5g are shown a number of different embodiments of non-linear cutting edges of the profiling cutting insert, whereof all except one (FIG. 5d) are asymmetrical about the longitudinal axis CL of the cutting insert.

The clamping means may alternatively be developed with an internal pull rod, such as a stretching screw, where the hole 25 comprises an integral thread which cooperates with a threaded free end with the pull rod while the other end is secured at an axially movable nut. In the latter example there would be an elongated slot along the support surface of the holder. In the embodiment shown in FIG. 1D the grooves have been formed through direct pressing and sintering or through grinding.

It will be appreciated that a cutting insert and a tool for form turning are provided where the cutting insert can be mounted on the holder in a simple manner, wherein the design of the cutting insert simplifies regrinding, and wherein the tool comprises a minimum of parts. In addition, the cutting insert is rigidly held on the holder, which is a advantageous when using asymmetrical, non-linear cutting edges for form turning.

Although the waffle pattern has been shown as formed by the ridge sets 22A, 22B of the turning insert, the waffle pattern could, instead, be formed on the support surface 16 of the holder. In that event, the support surface 22 of the insert would be shaped in the manner of FIG. 2, i.e., the ridge sets would be arranged in respective regions of the support surface.

While the ridges are shown as being either parallel, or perpendicular, to the workpiece, they could extend at any orientation relative to the workpiece, as long as the first and second ridge sets of each support surface 16, 22 are oriented substantially perpendicular to each other.

The elongated hole need not be formed in the turning insert. Instead, it could be formed in the holder.

Although the present invention is described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A turning tool for form-turning workpieces, comprising a holder, a cutting insert mounted on the holder, and a releasable clamp element for clamping the insert to the holder; the cutting insert being elongated along an axis and including a non-linear cutting edge at an axial end thereof; the cutting insert including a first support surface and a first hole; the holder including a second support surface and a second hole; the second hole aligned with the first hole for receiving the clamp which presses the first and second support surfaces together; each of the first and second support surfaces including first and second sets of grooves oriented substantially perpendicularly to one another; the grooves of each set extending substantially parallel and adjacent to one another and defining ridges therebetween, at least one of the first and second support surfaces having its first and second sets of grooves arranged in respective first and second regions of that support surface, wherein such first set of grooves is in non-intersecting relationship with such second set of grooves in the first and second regions; the ridges of the first set of grooves of the cutting insert engaging the ridges of the first set of grooves of the holder in the first region to support the cutting insert against movement in a first direction; the ridges of the second set of grooves of the cutting insert engaging the ridges of the second set of grooves of the holder in the second region to support the cutting insert against movement in a second direction substantially perpendicular to the first direction; one of the first and second holes being elongated in a direction intersecting the cutting edge to enable the insert to be fed in that direction relative to the holder.

2. The turning tool according to claim 1 wherein the at least one of the support surfaces includes a transition area between the first and second regions where the first and second sets of grooves intersect one another in that transition area.

3. The turning tool according to claim 1 wherein each of the first and second support surfaces has its first and second sets of grooves arranged in respective first and second regions of the support surface.

4. The turning tool according to claim 1 where one of the first and second support surfaces has its first and second sets of grooves arranged in respective first and second regions of its support surface; the other of the first and second support surfaces having both of its first and second sets of ridges arranged in the same region of its support surface to form protrusions arranged in a waffle type pattern.

5. The turning tool according to claim 1 wherein each support surface has one of its sets of grooves oriented parallel to the direction of elongation of the elongated hole, and the other of its sets of grooves oriented perpendicular to that direction of elongation.

6. The turning tool according to claim 1 wherein the first and second holes extend perpendicularly to an upper surface of the cutting insert.

7. The turning tool according to claim 6 wherein the upper surface is planar and oriented parallel to the support surface of the cutting insert.

8. The turning tool according to claim 7 wherein the axis constitutes a longitudinal center axis of the cutting insert, wherein the cutting insert is configured systematically about the longitudinal axis.

9. The turning tool according to claim 8 wherein the cutting edge lies in the upper surface of the cutting insert.

10. The turning tool according to claim 9 wherein the elongated hole has two rounded ends, the cutting edge being longer than a maximum width of either of the rounded ends.

11. The turning tool according to claim 1 wherein the cutting edge lies in an upper surface of the cutting insert.

12. The turning tool according to claim 11 wherein the elongated hole has two rounded ends, the cutting edge being longer than a maximum width of either of the rounded ends.

13. The turning tool according to claim 11 wherein the first hole constitutes the elongated hole and passes through an upper surface of the cutting insert, the elongated hole being spaced from the cutting edge.

14. The turning tool according to claim 1 wherein the first hole constitutes the elongated hole and passes through an upper surface of the cutting insert, the elongated hole being spaced from the cutting edge.

15. The turning tool according to claim 14 wherein the second hole has a female screw thread.

* * * * *